United States Patent
Stanglmaier et al.

(10) Patent No.: US 7,299,623 B2
(45) Date of Patent: Nov. 27, 2007

(54) METHOD FOR CONTROLLING EXHAUST GAS TEMPERATURE AND SPACE VELOCITY DURING REGENERATION TO PROTECT TEMPERATURE SENSITIVE DIESEL ENGINE COMPONENTS AND AFTERTREATMENT DEVICES

(75) Inventors: Rudolf H. Stanglmaier, Fort Collins, CO (US); Ryan C. Roecker, San Antonio, TX (US); Charles E. Roberts, Jr., San Antonio, TX (US); Lee G. Dodge, San Antonio, TX (US); Christopher J. Chadwell, San Antonio, TX (US); Darius Mehta, San Antonio, TX (US); Daniel W. Stewart, Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 212 days.

(21) Appl. No.: 11/215,643

(22) Filed: Aug. 30, 2005

(65) Prior Publication Data

US 2006/0000203 A1 Jan. 5, 2006

(51) Int. Cl.
*F01N 3/00* (2006.01)
(52) U.S. Cl. ............. 60/274; 60/277; 60/280; 60/285; 60/295; 123/90.11; 123/90.15

(58) Field of Classification Search ............ 60/274, 60/277, 280, 285, 295, 297; 123/90.11, 90.15, 123/90.16, 90.17
See application file for complete search history.

(56) References Cited

U.S. PATENT DOCUMENTS

| | | | |
|---|---|---|---|
| 5,278,762 A | 1/1994 | Kawamura | |
| 5,398,502 A | 3/1995 | Watanabe | |
| 5,477,827 A * | 12/1995 | Weisman et al. | 123/436 |
| 5,483,941 A * | 1/1996 | Cullen et al. | 123/481 |
| 5,974,791 A * | 11/1999 | Hirota et al. | 60/276 |
| 6,000,384 A | 12/1999 | Brown et al. | |
| 6,029,626 A | 2/2000 | Bruestle | |
| 6,192,868 B1 | 2/2001 | Barnes et al. | |
| 6,257,197 B1 | 7/2001 | Nishimura et al. | |
| 6,634,170 B2 * | 10/2003 | Hiranuma et al. | 60/295 |
| 6,698,185 B2 * | 3/2004 | Kitahara | 60/274 |
| 6,802,180 B2 * | 10/2004 | Gabe et al. | 60/285 |
| 6,848,300 B2 * | 2/2005 | Schmid et al. | 73/118.1 |
| 6,851,258 B2 * | 2/2005 | Kawashima et al. | 60/311 |
| 7,137,246 B2 * | 11/2006 | van Nieuwstadt et al. | 60/295 |
| 2006/0096280 A1 * | 5/2006 | Zhan et al. | 60/297 |

* cited by examiner

*Primary Examiner*—Tu M. Nguyen
(74) *Attorney, Agent, or Firm*—Gunn & Lee PC

(57) ABSTRACT

A method for controlling the temperature and/or space velocity of exhaust gas provides control of the maximum temperature of the exhaust gas to prevent thermal damage to the Diesel engine components and associated aftertreatment devices during regeneration of the aftertreatment devices. The method includes controlling intake and/or exhaust valve opening timing and duration, either singly or in combination with selective individual cylinder cutout, in response to sensed engine operating parameters.

6 Claims, 1 Drawing Sheet

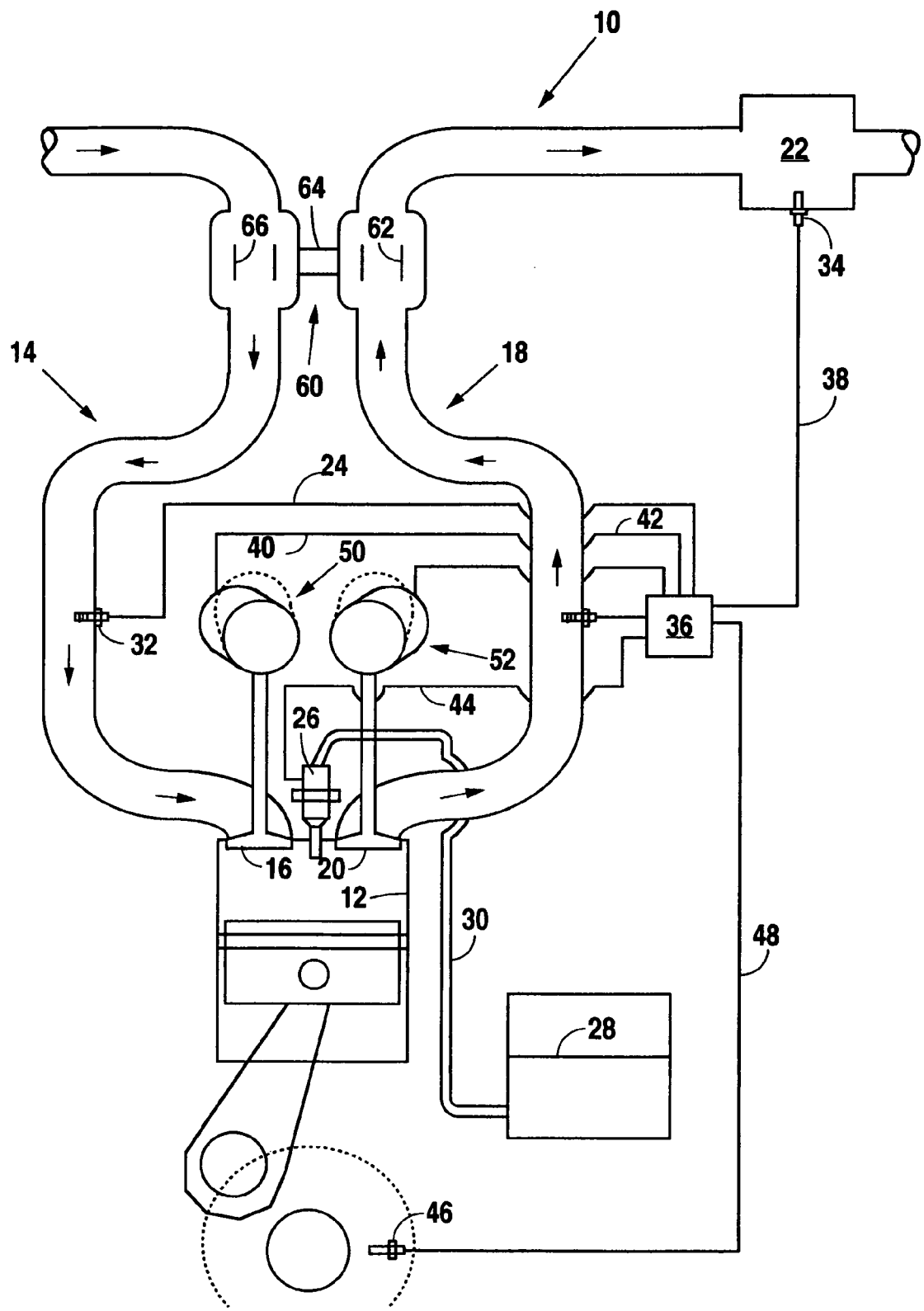

METHOD FOR CONTROLLING EXHAUST GAS TEMPERATURE AND SPACE VELOCITY DURING REGENERATION TO PROTECT TEMPERATURE SENSITIVE DIESEL ENGINE COMPONENTS AND AFTERTREATMENT DEVICES

BACKGROUND OF THE INVENTION

1. Technical Field

This invention relates generally to a method for using a variable valve actuation system to control the temperature and space velocity of exhaust gases delivered to an aftertreatment system of a Diesel engine, and more particularly to a method for using a variable valve actuation system to control exhaust gas temperature during regeneration of exhaust gas aftertreatment devices.

2. Background Art

Worldwide emissions regulations slated for introduction during the next five to ten years will require that Diesel engines be equipped with some form of exhaust aftertreatment device, forcing the Diesel industry into utilizing catalyst and emissions "trap" technologies not widely used heretofore for Diesel engines. For optimum efficiency, these technologies, e.g., lean $NO_x$ catalysts, lean $NO_x$ traps, and particulate traps, require operating temperatures outside of the temperature range available for a significant portion of a Diesel engine operating range.

Several approaches have been proposed to control exhaust gas temperature in spark-ignition engines. For example, U.S. Pat. No. 6,029,626 granted Feb. 29, 2000 to Claus Bruestle for ULEV CONCEPT FOR HIGH-PERFORMANCE ENGINES proposes using variable valve timing to reduce unburned hydrocarbon emissions. Unburned hydrocarbon emissions are a pollutant commonly associated with spark ignited engines. U.S. Pat. No. 5,398,502 granted Mar. 21, 1995 to Kenzo Watanabe for a SYSTEM FOR CONTROLLING A VALVE MECHANISM FOR AN INTERNAL COMBUSTION ENGINE is also directed to exhaust gas temperature regulation in spark-ignition engines. More specifically, U.S. Pat. No. 5,398,502 proposes the use of variable valve timing to control exhaust temperature as a strategy to increase exhaust gas temperature for fast catalytic converter lightoff during engine cold-starts. This patent further proposes exhaust gas temperature control when it is deemed that catalyst damage may occur due to over-heating.

As noted above, because of tightening emissions regulations worldwide, future Diesel engine powered vehicles will have to use one or more types of exhaust gas aftertreatment devices, including particulate filters, lean $NO_x$ adsorbers or traps, oxidation and/or other catalysts. Some aftertreatment devices must be regenerated to maintain their pollutant conversion efficiency. This is typically achieved by operating the Diesel engine in a mode that produces exhaust gas conditions that regenerate the aftertreatment device by temporarily raising its temperature or by changing the composition of the exhaust gases flowing through it. However, when regeneration is required under some engine operating conditions (typically very high load conditions), the exhaust gas temperature can be so high as to damage some of the engine components, such as exhaust valves and turbocharger, or the aftertreatment devices themselves.

The present invention is directed to overcoming the problems associated with protecting temperature sensitive engine components and aftertreatment devices during regeneration. It is desirable to have a method for controlling the temperature and/or mass flow rate of exhaust gases during temporary periods of operation required to regenerate one or more aftertreatment devices. Moreover, it is desirable to have such a method that advantageously uses variable valve actuation to control the temperature and mass flow rate of exhaust gases introduced into to the exhaust stream.

SUMMARY OF THE INVENTION

In accordance with one aspect of the present invention, a method for controlling the exhaust gas temperature of a Diesel engine during operation in an aftertreatment device regeneration mode includes determining a maximum exhaust gas temperature at which thermal damage to engine components and aftertreatment devices is precluded, and sensing the exhaust gas temperature. The operation of at least one of an intake valve, an exhaust valve, and a fuel injector, is controlled in response to the sensed value of the exhaust gas temperature. The method further includes maintaining the temperature of the engine exhaust gas at a value less than the determined maximum temperature at which thermal damage to engine components and aftertreatment devices is precluded during regeneration of the aftertreatment device.

In accordance with another aspect of the present invention, a method for controlling the space velocity of exhaust gas passing through an exhaust gas aftertreatment device during regeneration includes determining a desirable space velocity for exhaust gases passing through the aftertreatment device at which the aftertreatment device is beneficially regenerated, and sensing at least one engine operating parameter correlative of the mass airflow rate of air passing through the engine. The method further includes maintaining the desirable mass airflow rate during operation of the engine in a regeneration mode by controllably deactivating at least one of an intake valve, an exhaust valve, and a fuel injector, in response to the sensed engine operating parameter correlative of the mass airflow rate of air passing through the engine.

BRIEF DESCRIPTION OF THE DRAWING

A more complete understanding of the present invention, embodying a method for controlling the temperature and space velocity of exhaust gases delivered to the aftertreatment systems of Diesel engines, may be had by reference to the following detailed description when taken in conjunction with the accompanying drawing, wherein the sole drawing is a schematic representation of a Diesel engine adapted to carry out exhaust gas temperature and space velocity control in accordance with the method embodying the present invention.

DETAILED DESCRIPTION OF THE INVENTION

The present invention is directed to Diesel engines which have exhaust gas aftertreatment devices capable of, or requiring, regeneration to maintain their ability to effectively remove pollutants from the exhaust stream. In particular, lean $NO_x$ traps, or adsorbers, are effectively used in lean burn gasoline engines and in diesel engines. The adsorbers, which are typically incorporated into a catalyst washcoat, chemically bind nitrogen oxides during lean engine operation. After the adsorber capacity is saturated, the system is regenerated, and released $NO_x$ is catalytically reduced during a period of rich engine operation. Particulate traps typically capture particle emissions through a combination of surface-type and deep-bed filtration mechanisms, such as diffusion deposition, inertial deposition, or flow-line interception. Collected particles are removed from the filter, continuously with the aid of a catalyst to lower soot ignition temperature, or periodically through thermal regeneration. Diesel particulate filters are very effective in controlling the solid part of particulate matter (PM) emission.

For illustrative purposes the method controlling exhaust gas temperature and space velocity of exhaust gas during aftertreatment device regeneration, in accordance with the present invention, is described in conjunction with a Diesel engine 10 illustrated schematically in the sole drawing figure. The Diesel engine 10 has a combustion chamber 12, an intake air system 14 in controlled fluid communication with the combustion chamber 12 by way of an intake valve 16, and an exhaust gas system 18 in controlled fluid communication with the combustion chamber 12 by way of an exhaust valve 20. An exhaust gas aftertreatment device 22, for example a lean $NO_x$ trap (LNT) or a particulate trap as described above, is disposed in the exhaust gas system 18 at a position downstream of the exhaust valve 20. Often, lean $NO_x$ traps or particulate traps are used in conjunction with other aftertreatment devices such as selective reduction, oxidation, three-way and/or other catalytic devices, not shown.

Operation of the intake valve 16 and the exhaust valve 20 is respectively individually varied by any one of several well known variable valve actuation (VVA) systems 50,52. A means for controllably introducing fuel into the combustion chamber 12 is provided by a fuel injector 26 in fluid communication with a source of fuel 28 by way of a fuel conduit 30. Desirably, a mass airflow sensor 32 is disposed in the intake air system 14 at a position upstream of the intake valve 16. In the illustrative embodiment of the method embodying the present invention, a temperature sensor 34 is disposed in the exhaust gas aftertreatment device 22 at a position suitable for sensing the temperature of the aftertreatment device 22. Alternatively, the temperature sensor 34 could be disposed in the exhaust system 18 at position upstream of the aftertreatment device 22.

An electronic engine control unit (ECU) 36 receives a signal 38 from the aftertreatment device temperature sensor 34 and, in certain embodiments of the present invention, a mass airflow signal 24 from the mass airflow sensor 32. A crankshaft position sensor 46 provides a signal 48 to the ECU 36 indicative of crankshaft position. The ECU 36, in accordance with a preferred embodiment of the present invention described below in greater detail, delivers a control signal 40 to the VVA system 50 to control operation of the intake valve 16, a control signal 42 to the VVA system 52 to control operation of the exhaust valve 20, and a control signal 44 to control operation of the fuel injector 26.

In the illustrated embodiment, the Diesel engine 10 has a turbocharger 60 with a turbine 62 driven by exhaust gas discharged through the exhaust system 18. The turbine 62 is connected by a shaft 64 to a compressor 66 disposed in the air intake system 14.

The preferred embodiment of the present invention is directed to providing temperature control of exhaust gases during the temporary periods of abnormal operation required to periodically regenerate certain aftertreatment devices 22, including lean $NO_x$ traps or adsorbers and particulate matter filters or traps. As described above, such devices require that the Diesel engine 10 be operated temporarily in a fashion that changes the temperature of the exhaust gas, the composition of the exhaust stream, or both. Under some engine operating conditions, particularly at very high load, the regeneration event can produce very high exhaust temperatures that could damage engine components, such as the exhaust valve 20, the turbocharger 60, the aftertreatment device 22, or other exhaust gas aftertreatment devices or components not specifically described or shown.

The method for controlling excessively high exhaust temperatures in accordance with the present invention combines the use of variable combustion timing with variable exhaust valve opening timing to provide control of the temperature of the exhaust gases from the Diesel engine 10. Variation in fuel injection timing or fuel-air ignition timing provides in-cylinder control of the time of combustion of the engine cycle. Later injection or ignition timing results in increased gas temperatures late in the engine's expansion stroke, while earlier injection or ignition timing causes reduced gas temperatures late in the expansion stroke.

Thus, the timing of the exhaust valve 20 opening event controls the temperature at which the engine's exhaust gas is allowed to enter the exhaust system 18. During the expansion stroke of the engine, work is extracted from the in-cylinder exhaust gas by motion of the piston. The exhaust valve 20 opening event allows energy previously available to the piston to be transported to the exhaust system 18 in the form of thermal energy carried by the exhaust gas mass flow. Thus, by varying exhaust valve 20 opening timing, the energy made available to the exhaust system 18 can be varied. Desirably, in accordance with the present invention, the temperature of the exhaust gas is controlled by combined control of combustion timing and exhaust valve 20 opening timing, to provide a feedgas temperature suitable for the regeneration of the aftertreatment device 22, but less than the maximum temperature at which thermal damage to engine components or aftertreatment devices is precluded.

In the preferred embodiment of the present invention, exhaust gas temperature and space velocity is achieved by the use of variable valve actuation (VVA), either separately or in combination with variable combustion timing (VCT), and/or individual cylinder cutout. In the illustrated embodiment, the engine electronic control unit 36 receives a temperature signal 38 from the aftertreatment device temperature sensor 34 and, if desired, a crankshaft position signal 48 from the crankshaft position sensor 46 and, if further desired as described below, a mass airflow signal 24 from the mass airflow sensor 32. In accordance with a preprogramed schedule, the ECU 36 respectively controls, through control signals 40,42 the opening, duration, and closing of the intake valve 16 and the exhaust valve 20.

Use of VVA to reduce Diesel engine airflow is desirable because the "throttling" effect is created by the intake or exhaust valve. Throttling losses across the intake and exhaust valves are always present and are often used to create the bulk flow or turbulence necessary for improved combustion. Hence, control of airflow by VVA only minimally increases throttling losses, when compared to other methods of airflow control that require secondary or additional throttles. Importantly, as described above, by varying the opening timing of the intake valve 16 and/or the exhaust valve 20, the energy made available to the exhaust system 18 can be varied.

In a similar manner, the ECU 36 controls fuel injection timing and duration by the control signal 44 electrically connected with the fuel injector 26. Variation in fuel injection timing also provides in-cylinder control of the time of combustion during the engine cycle and may advantageously be used in combination with variable valve actuation to provide an optimal feedgas temperature for use by the emissions aftertreatment device 22.

Variable valve actuation may be used to provide individual cylinder cutout to provide an extended range of temperature control and regulation of the space velocity of exhaust gas passing through the aftertreatment device 22 by controlling the mass flow rate of air passing through the engine 10. Control of mass flow rate, as sensed by the mass airflow sensor 32 and delivered to the engine control unit 36 by signal 24, allows optimal space velocities to be produced for efficient operation of emissions aftertreatment devices. Heretofore, most applications of individual cylinder cutout have been implemented on throttled, spark ignition engines. On throttled spark ignition engines, most of the advantages realized through cylinder cutout are due to the ability of such engines to run unthrottled when sufficient cylinders are disabled and the remaining cylinders ran at higher specific loads to maintain overall engine power.

Cylinder cutout for Diesel engines can be accomplished by several methods. Simple deactivation of fuel delivery to some cylinders effectively deactivates power production from the selected cylinders. However, with no valve deactivation, the unfueled cylinders will act as air pumps through which work is consumed. Additionally, the unfueled cylinders will cool quickly as fresh air passes through the cylinder, thus creating difficulties in subsequent re-firing. In accordance with the present invention, valve deactivation is used to selectively reduce or eliminate airflow through the cylinders that are unfueled. Various valve deactivation choices can be made, including intake valve deactivation, exhaust valve deactivation, or both.

Alternative means for determining the temperature environment of the aftertreatment device 22 and mass airflow through the engine 10, other than the above specifically described sensors and sensor locations, may be readily adapted for carrying out the method embodying the present invention. For example, temperature sensors may be positioned in the exhaust system 18 upstream and/or downstream of the aftertreatment device 22, whereby the operating temperature of the aftertreatment device can be extrapolated. It is also feasible to establish a map of predicted exhaust gas temperatures as a function of engine load, engine speed and ambient air temperature for a specific engine, and use measurements of engine load, speed and ambient temperature as input signals to the electronic control unit 36 to control the temperature of the exhaust gas aftertreatment device 22 during periodic regeneration. Also, other indicators of mass flow rate, as well as a predefined map of mass airflow as a function of engine load and speed, may be used to regulate the space velocity of exhaust gas passing through the exhaust gas aftertreatment device 22 disposed in the exhaust system 18 of the engine 10.

Although the present invention is described in terms of preferred illustrative embodiments, those skilled in the art will recognize that the above-described temperature and mass airflow sensing and control arrangements are illustrative of a representative Diesel engine 10 and regeneratable aftertreatment device 22. Actual system arrangements will be dependent upon the configuration and operating characteristics of a specific engine and aftertreatment device. Also, for equivalent power output in any engine, it should be realized that there are multiple combinations of cylinder cutout, individual cylinder injection timings, and intake and exhaust valve timings that may be implemented to provide exhaust gas temperatures and space velocities to emissions aftertreatment devices. Moreover, the optimal cylinder cutout scheme for different engines will vary depending upon the heat transfer characteristics of the cylinder, as well as ring-pack and cylinder design. Furthermore, the method embodying the present invention as applied to controlling the temperature and space velocity of gases passing through a lean $NO_x$ and/or particulate trap is equally applicable to other exhaust gas treatment devices. Such applications of the method embodying the present invention are intended to fall within the scope of the following claims.

Other aspects, features, and advantages of the present invention may be obtained from a study of this disclosure and the drawings, along with the appended

What is claimed is:

1. A method for controlling exhaust gas temperature to protect temperature sensitive components of a Diesel engine and associated exhaust gas aftertreatment devices during regeneration, said engine having at least one combustion chamber, at least one regenerable exhaust gas aftertreatment device disposed in an exhaust system of the engine, a turbocharger in fluid communication with said exhaust system, at least one intake valve interposed between an air intake system of the engine and said combustion chamber, at least one exhaust valve interposed between said combustion chamber and said turbocharger, and a means for controllably introducing fuel into said combustion chamber, said method comprising:

determining a maximum exhaust gas temperature at which thermal damage to said exhaust valve and said regenerable exhaust gas aftertreatment device is precluded;

sensing said exhaust gas temperature;

controlling the operation of at least one of said intake valve and said exhaust valve in response to the sensed value of said exhaust gas temperature;

maintaining the temperature of said exhaust gas at a value less than said maximum exhaust gas temperature at which thermal damage to said exhaust valve and said regenerable exhaust gas aftertreatment device is precluded;

wherein said regenerable exhaust aftertreatment device comprises a lean $NO_x$ trap, and said method includes operating said Diesel engine in at least one of a thermal regenerating mode and a fuel-rich regenerating mode, and said step of sensing said exhaust gas temperature includes sensing the exhaust gas temperature during the operation of the Diesel engine in said one of the thermal regeneration and the fuel-rich operating mode; and, determining a maximum exhaust gas temperature at which thermal damage to said turbocharger is precluded and maintaining the temperature of said exhaust gas at a value less than said maximum exhaust gas temperature at which thermal damage to said turbocharger is precluded.

2. The method, as set forth in claim 1, wherein said controlling step further includes controlling the operation of said means for controllably introducing fuel into the combustion chamber.

3. The method, as set forth in claim 1, wherein said method includes:

determining a desirable mass airflow rate for the treatment of exhaust gases passing through said at least one regenerable exhaust gas aftertreatment device during at least one of said thermal regeneration mode and said fuel-rich mode;

sensing the value of at least one Diesel engine operating parameter correlative of mass airflow passing through said engine; and maintaining said desirable mass airflow rate at said desirable mass airflow rate by controllably deactivating at least one of said intake valve, said exhaust valve, and said means for controllably introducing fuel into the combustion chamber, in response to the sensed value of said engine operating parameter during at least one of said thermal regeneration mode and said fuel-rich mode.

4. The method, as set forth in claim 3, wherein said sensing the value of at least one Diesel engine operating parameter correlative of mass airflow passing through the Diesel engine includes sensing the mass flow rate of air passing through the air intake system of the engine.

5. A The method, as set forth in claim 1, comprising:
   determining a desirable space velocity for exhaust gases passing through said exhaust gas aftertreatment device at which the exhaust gas aftertreatment device is efficaciously regenerated.

6. The method, as set forth in claim 5, wherein said method includes:
   detecting the value of at least one engine operating parameter correlative of engine speed, engine load, and exhaust gas temperature;

controlling the operation of at least one of said intake valve, said exhaust valve, and said means for controllably introducing fuel into the combustion chamber of the engine, in response to the value of said detected engine operating parameter; and maintaining the temperature of engine exhaust gas introduced into said exhaust gas aftertreatment device at a value less than said determined maximum exhaust gas temperature at which thermal damage to said exhaust gas aftertreatment device is precluded during operation of said engine in a regenerative mode in response to the detected value of said at least one engine operating parameter.

\* \* \* \* \*